United States Patent [19]

Marui

[11] Patent Number: 5,681,119
[45] Date of Patent: Oct. 28, 1997

[54] BALL BEARING OF A HEAD COMPONENT FOR A BICYCLE WITH AN IMPROVED MOUNTING STRUCTURE

[75] Inventor: Kohei Marui, Kobe, Japan

[73] Assignee: Marui Co., Ltd., Hyogo-ken, Japan

[21] Appl. No.: 599,175

[22] Filed: Feb. 9, 1996

[30] Foreign Application Priority Data

Feb. 21, 1995 [JP] Japan .................. 7-032646
Nov. 20, 1995 [JP] Japan .................. 7-301596

[51] Int. Cl.⁶ .................. B62K 21/18; F16C 33/78
[52] U.S. Cl. .................. 384/545; 74/551.1; 280/279; 384/477
[58] Field of Search .................. 384/545, 538, 384/477; 74/551.1; 280/279

[56] References Cited

U.S. PATENT DOCUMENTS

| | | | |
|---|---|---|---|
| 4,466,629 | 8/1984 | Sinyard | 280/279 |
| 5,095,770 | 3/1992 | Rader, III | 74/551.1 |
| 5,163,758 | 11/1992 | Chi | 384/545 X |
| 5,246,296 | 9/1993 | Chi | 280/279 X |
| 5,286,118 | 2/1994 | Chi | 384/545 |
| 5,330,220 | 7/1994 | Nagano | 280/279 |
| 5,332,245 | 7/1994 | King | 74/551.1 X |

FOREIGN PATENT DOCUMENTS

| | | |
|---|---|---|
| 51-25887 | 7/1976 | Japan . |
| 51-113955 | 9/1976 | Japan . |
| 54-10657 | 1/1979 | Japan . |
| 57-23279 | 5/1982 | Japan . |
| 58-122678 | 8/1983 | Japan . |
| 1-68294 | 5/1989 | Japan . |

*Primary Examiner*—Thomas R. Hannon
*Attorney, Agent, or Firm*—Rabin, Champagne & Lynt, P.C.

[57] ABSTRACT

A cover faces an end portion of a ball head cup attached to an end of a head pipe and is fitted on a fork stem. A rolling ball group is interposed between the ball head cup and the cover. A top cone is put on the rolling ball group from the cover side. The cover is formed of rubber or an elastic synthetic resin. The outer periphery of the cover is configured to be in contact with the inner periphery of the ball head cup. A cone ring inserted in the top cone and having a slit in its side wall is attached in the cover. Thus, the cover prevents the invasion of rainwater etc. through the slit of the cone ring.

4 Claims, 9 Drawing Sheets

BALL BEARING OF A HEAD COMPONENT FOR A BICYCLE WITH AN IMPROVED MOUNTING STRUCTURE

BACKGROUND OF THE INVENTION

1. Field of the Invention

The present invention relates to parts for bicycles, and more particularly, to a ball bearing of a bicycle component.

2. Description of the Background Art

FIG. 8 is a partial cross-sectional view of conventional head components which rotatably couple a head pipe 10 to a front fork 2 of a bicycle body. FIG. 9 is an external perspective view of the head components of FIG. 8.

Referring to these figures, a fork stem 20 is inserted through a head pipe 10 of a body frame 1. The fork stem 20 is rotatably held by an upper ball bearing 3 and a lower ball bearing 4 provided on both ends of the head pipe 10.

The upper ball bearing 3 includes a top ball head cup 31 which is fixed the head pipe 10 so as to be non-rotating and rolling ball groups 33a and 33b accommodated therein. The upper ball bearing 3 further includes a top cone 35 made of stainless steel which is placed upon the rolling ball groups 33a and 33b, and a cone ring 36 pressed between an upper end portion of the top cone 35 and the fork stem 20.

The cone ring 36 is pressed downward by a mounting tube 51 of a handle stem 5 connected to the fork stem 20, so as to be pressed and wedged between the top cone 35 and the fork stem 20. Pressing in the cone ring 36 sets the fork stem 20 in an appropriate position. A cover 32, made of aluminum, is forced in around an upper periphery of the top cone 35, and surrounds an upper periphery of the top ball head cup 31. A sealing ring 34, made of synthetic resin, is provided between the outer periphery of the top ball head cup 31 and the inner periphery of the cover 32. The sealing ring 34 prevents dust and rainwater from coming through the gap located between the outer periphery of the top ball head cup 31 and the cover 32.

The lower ball bearing 4 includes a bottom ball head cup 42 mounted and fixed to the head pipe 10, a crown cone 41 fixed to the fork stem 20, and rolling ball groups 43a and 43b interposed therebetween.

When the fork stem 20 is rotated by turning the bicycle handle, the cover 32 (force fitted on the top of cone 35) and the top ball head cup 31 (mounted to the head pipe 10) rotate smoothly relative to each other due to the rolling ball groups 33a and 33b. The sealing ring 34, interposed in the gap between the outer periphery of the top ball head cup 31 and the inner periphery of the cover 32, prevents the invasion of dust, rainwater, and the like into the region of the rolling ball groups 33a and 33b. Accordingly, smooth rotation of the fork stem 20 can be obtained over a long period of time.

In the conventional structure however, the cover 32 and the sealing ring 34 are separately constructed. Thus, the conventional structure has the disadvantage of an increased number of parts, which increases the complexity of the structure, and decreases the manufacturing efficiency.

Furthermore, in the conventional structure, a slit 361 is provided in the cone ring 36 in the diameter direction. The slit 361 is partially covered by the lower end of the mounting tube 51 and the cover 32. However, a part of the slit 361 is exposed in the boundary between the cover 32 and the mounting tube 51. Accordingly dust and rainwater may invade the regions of the rolling ball groups 33a and 33b through the exposed slit 361.

SUMMARY OF THE INVENTION

It is an object of the present invention to reduce the number of parts in a ball bearing of a head component for a bicycle.

It is another object of the present invention to improve the manufacturing efficiency of a ball bearing of a head component for a bicycle.

It is still another object of the present invention to prevent the invasion of dust and rainwater into a ball bearing of a head component for a bicycle.

To achieve the objects stated above, the present invention is directed to a ball bearing of a bicycle head component which rotatably couples a head pipe and a fork stem inserted therethrough together, and which includes a ball head cup attached to the end of the head pipe, a cover attached around an exposed portion of the fork stem to face an inner periphery of the ball head cup, a rolling ball group interposed between the ball head cup and the cover, and a top cone which presses the rolling ball group onto the ball head cup side, wherein the cover is formed of an elastic body and its end periphery is slidably in contact with the inner periphery of the ball head cup.

In the ball bearing as described above, the end periphery of the cover is in contact with the inner periphery of the ball head cup to effect a sealing function to prevent the invasion of rainwater, dust, etc. into a portion where the rolling balls, etc. are provided. Accordingly, no independent parts for sealing are necessary, which simplifies the structure. Furthermore, a ball bearing can be obtained with enhanced manufacturing efficiency as the number of parts is reduced.

To achieve the objects stated above, the present invention is directed to a structure of a mounting portion of a ball bearing of a bicycle head component, which is attached to an end of a head pipe for rotatably coupling the head pipe and a folk stem inserted therethrough together, and which includes a rolling ball group that surrounds the fork stem, a top cone fitted around the fork stem in contact with the rolling ball group, a cone ring having a slit in an axis line direction formed in its peripheral wall and pressed like a wedge into a circular gap between an inner periphery of the top cone and the fork stem to press the top cone on the rolling ball group side, and a surrounding member which surrounds the cone ring and is fitted on the fork stem.

In the structure as stated above, the slit formed in the cone ring is covered with the surrounding member, so as not to be exposed. Accordingly, the structure prevents dust and rainwater from invading through the slit.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
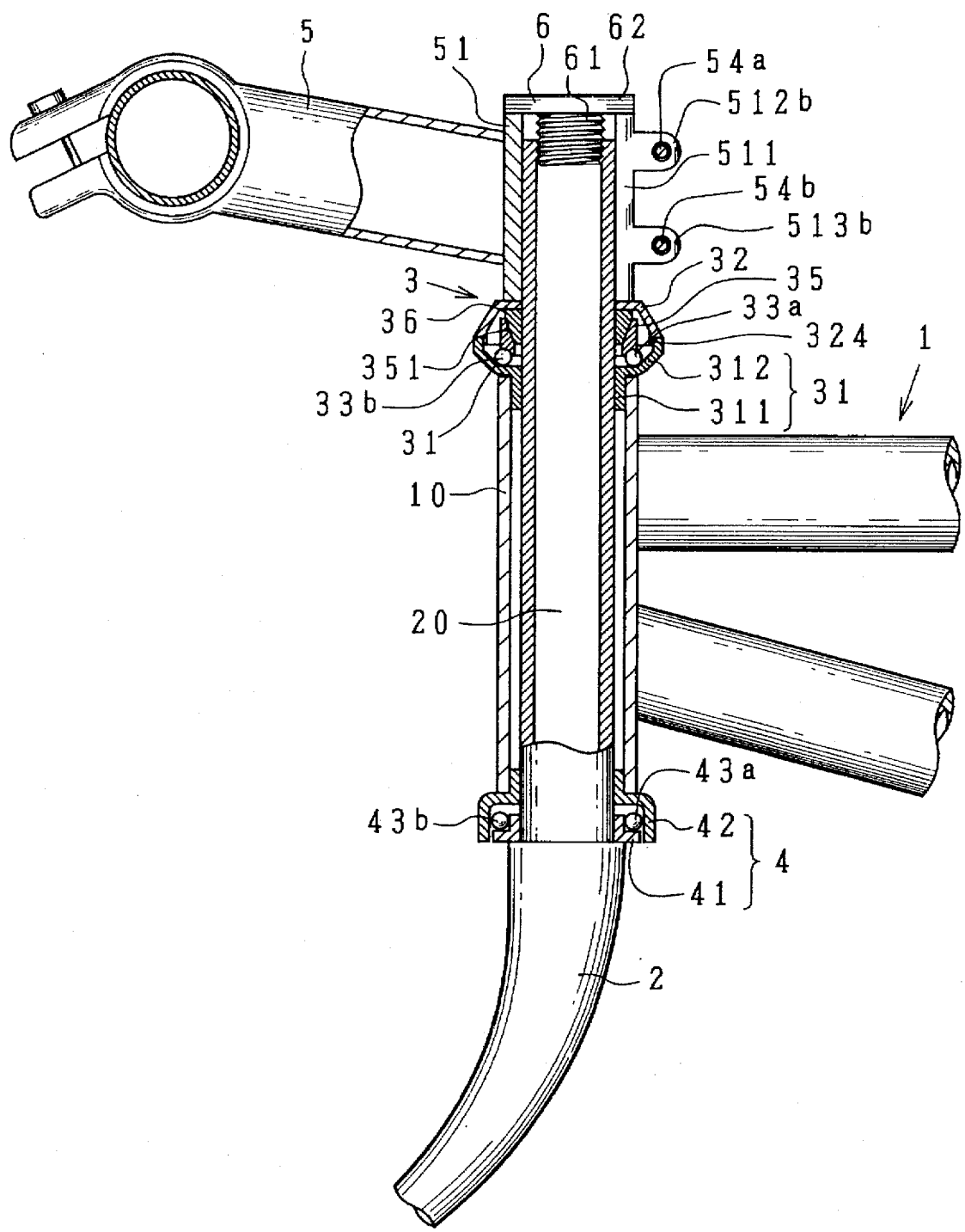
FIG. 1 is a partial sectional view of a bicycle head component, parts according to a first embodiment of the present invention.
Figure 2:
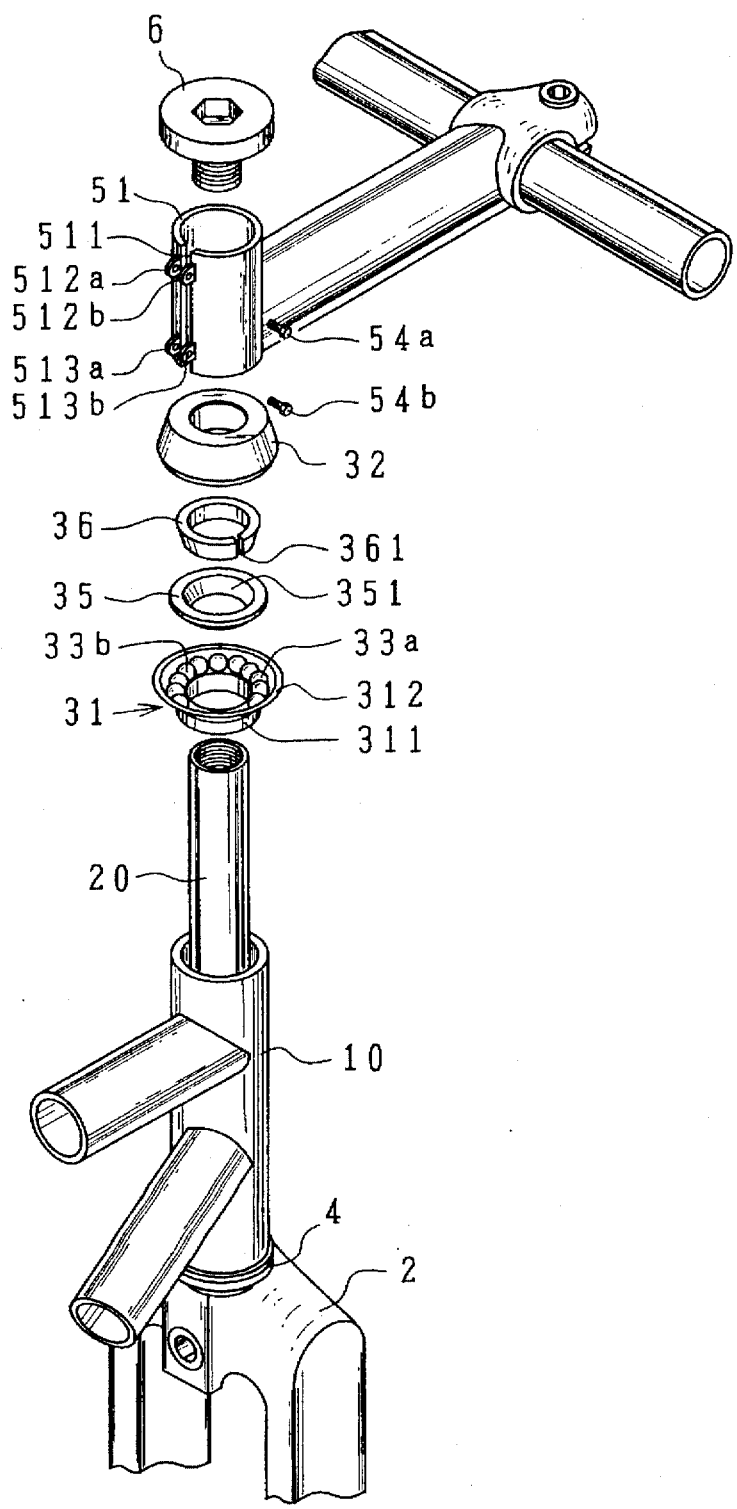
FIG. 2 is an exploded perspective view of the head component of FIG. 1.

FIG. 1 is a partial sectional view of a bicycle head component according to a first preferred embodiment of the present invention. FIG. 2 is an exploded perspective view of the structure of FIG. 1.

Referring to these figures, an upper ball bearing 3 comprises a stainless top ball head cup 31 which includes a cylindrical portion 311 forced in an upper end of a head pipe 10, and a conical portion 312 which is flared and enlarged the upward direction. Rolling ball groups 33a and 33b are provided in the conical portion 312.

The rolling ball groups 33a and 33b are pressed toward and against the top ball head cup 31 using a stainless top cone 35. Top cone 35 has an inner, surface 351 which is tapered in the direction.

A cone ring 36 is interposed between the top cone 35 and the fork stem 20. Cone ring 36 is formed of synthetic resin, and has a slit 361 formed in its side wall and which extends in an axial direction, as shown in FIG. 2. The outer surface of the cone ring 36 is tapered, so as to correspond to the tapered surface 351 of the top cone 35.

Figure 3:
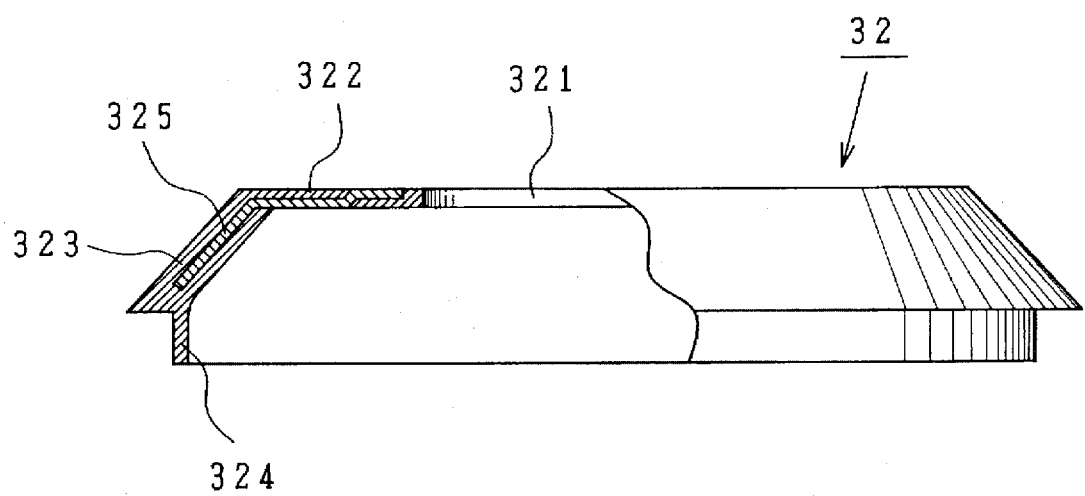
FIG. 3 is an enlarged, partial sectional view of the cover shown in FIG. 1 and FIG. 2.

FIG. 3 is an enlarged, partial sectional view of the cover 32 shown in FIG. 1 and FIG. 2.

Referring to FIG. 3, the cover 32 surrounds the cone ring 36 and the top cone 35, and has an elastic body comprised of an elastic synthetic resin. The cover 32 includes a disk portion 322 having a center hole 321 with a diameter almost equal to an external diameter of the fork stem 20. Cover 32 also has a skirt portion 323 extending and expanding downwardly from a periphery of disk portion 322, and a circular lip 324 hanging from a lower end, inner periphery of the skirt portion 323. A reinforcing plate 325 is buried in the cover 32.

The reinforcing plate 325 is buried in the cover 32 to avoid deformation of cover 32 due to the application of an external force caused when an obstacle collides with the cover 32 after the bicycle has been assembled as described later, and to prevent the disadvantage of excessive deformation due to the application of pressure when the cover 32 is pressed by the cone ring 36 and the mounting tube 51 of the handle stem 5. The external diameter of the lower end of the circular lip 324 is the same as the inside diameter of the upper end of the top ball head cup 31. The outer periphery of the circular lip 324 thus comes in contact with the upper inner periphery of the top ball head cup 31 when mounted.

The lower ball bearing 4 attached to the lower end of the head pipe 10 includes a stainless crown cone 41, and a bottom ball head cup 42 surrounding crown cone 41, and rolling ball groups 43a and 43b interposed therebetween. A sealing ring (not shown) made of elastic synthetic resin may be positioned into the gap between the outer periphery of the crown cone 41 and the inner periphery of the bottom ball head cup 42 to prevent dust and rainwater from invading the portion where the rolling balls 43a and 43b are accommodated.

Next, the mounting of the front fork 2 to the body frame 1 using the ball bearings 3 and 4 will be described.

First, with the lower ball bearing 4 attached to the lower end of the head pipe 10, the fork stem 20 of the front fork 2 is inserted into the lower end of the head pipe 10 so that the upper part of the fork stem 20 projects from the upper end of the head pipe 10. Next, the top ball head cup 31 is fitted on the projecting portion of the fork stem 20 and its cylindrical portion 311 is driven into the head pipe 10, and is forced to engage therewith. Furthermore, after inserting the rolling ball groups 33a and 33b into the conical portion 312 of the top ball head cup 31, the top cone 35, the cone ring 36 and the cover 32, respectively, are inserted from the upper end of the fork stem 20. Then, the circular lip 324 of the cover 32 is fit into the upper end, inner periphery of the top ball head cup 31. Thus, the region of the upper ball bearing 3 in which the rolling ball groups 33a and 33b are accommodated is isolated from the outside elements and the invasion of dust and rainwater into this region is prevented.

Next, with the cover 32 attached, the mounting tube 51 of the handle stem 5 is fitted on the fork stem 20. A screw portion 61 of a cap 6 engages with the upper end, inner periphery of the fork stem 20 to press the mounting tube 51 downward by its flange portion 62. Thus, the disk portion 322 of the cover 32 is pressed by the lower end of the mounting tube 51. When a pressing force is further applied, the cone ring 36 is pressed down to wedge between the top cone 35 and the fork stem 20. Then, the fork stem 20 is centered.

When the cap 6 is tightened, the disk portion 322 of the cover 32 is held in a pressed, stable state between the lower end surface of the mounting tube 51 and the upper end surface of the cone ring 36. The cone ring 36 is covered with the cover 32 so that the slit 361 is not exposed. That is to say, the cover 32 serves as a surrounding member for surrounding the cone ring 36. Accordingly, as compared with the conventional head component, the waterproof and dustproof effects on the cone ring 36 are improved.

Finally, the clamping flanges 512a and 512b, and the clamping flanges 513a and 513b respectively facing each other, (with a slit 511 being formed in a rear wall of the mounting tube 51 (between the clamping flanges) are respectively tightened using clamping bolts 54a and 54b. Thus, the diameter of the mounting tube 51 is reduced to press against the fork stem 20. This completes the assembly of the front fork 2 and the handle stem 5.

In this way, in the upper ball bearing 3, the lower end portion of the cover 32 and the circular lip 324 come in contact with the upper end portion of the top ball head cup 31 to effect a sealing to prevent the invasion of rainwater and dust into the portion where the rolling ball groups 33a and 33b and the top cone 35 are accommodated. Hence, the number of parts is reduced as compared with the conventional head component which requires independent parts for sealing. Thus, the structure according to the invention is simplified.

Although the cover 32 is applied only to the upper ball bearing 3 in the above-described embodiment, the present invention may also be applied to the lower ball bearing 4. That is to say, the lower ball bearing 4 may have the same structure as that of the upper ball bearing 3.

Figure 4:
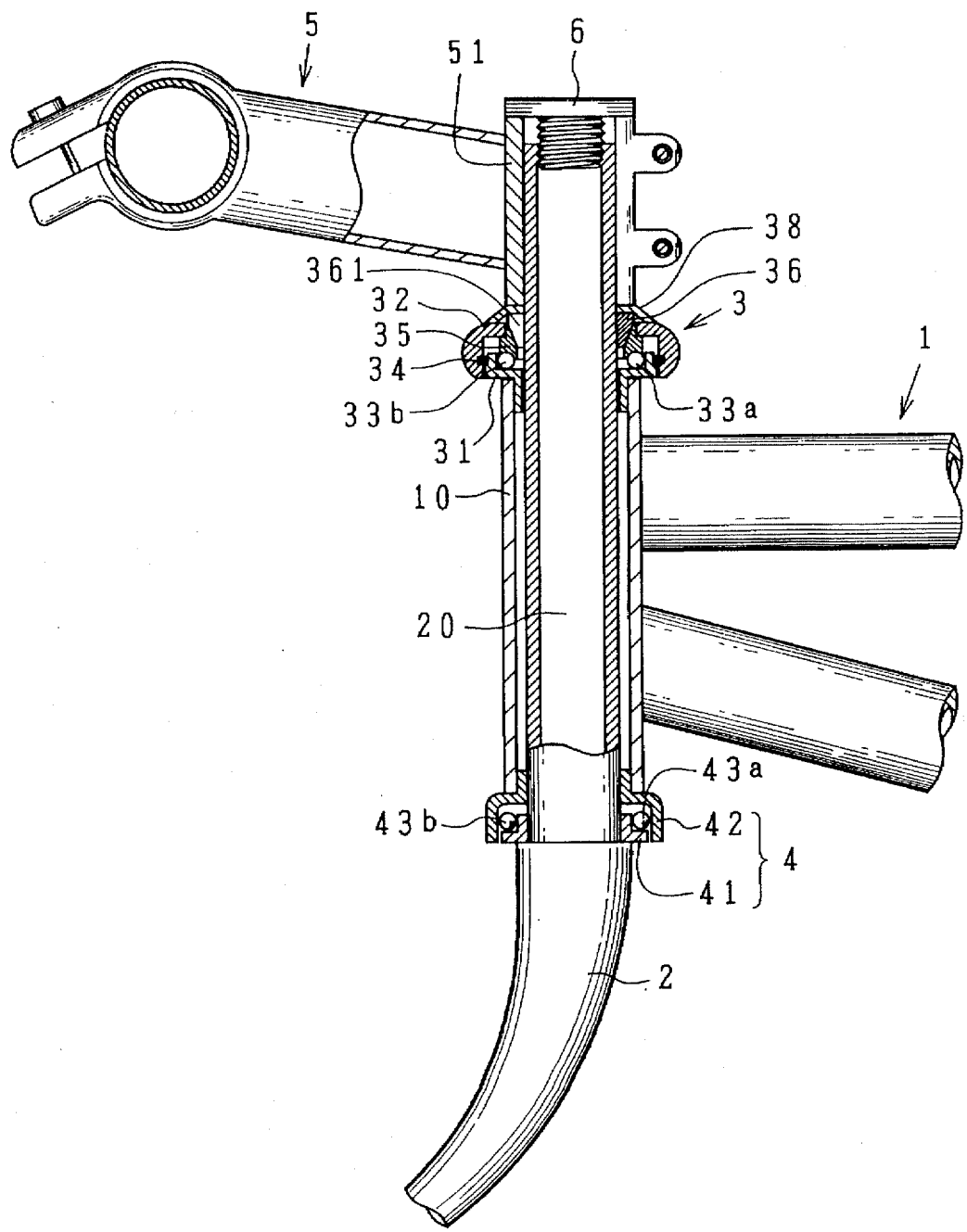
FIG. 4 is a partial sectional view of a bicycle head component, according to a second embodiment of the present invention.
Figure 5:
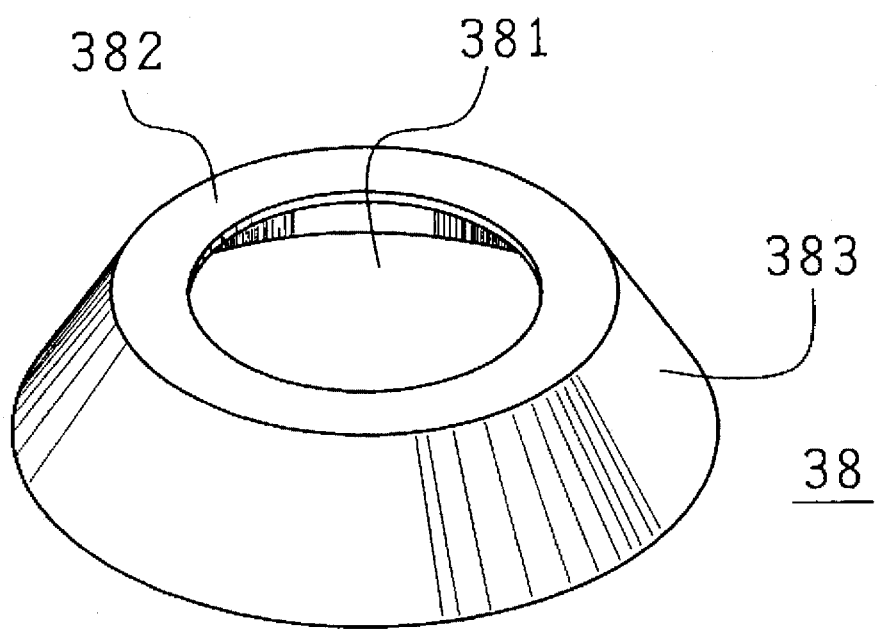
FIG. 5 is a perspective view of the surrounding member shown in FIG. 4.

FIG. 4 is a partial sectional view of a head component according to a second embodiment of the present invention. FIG. 5 is an external perspective view of the surrounding member 38 of FIG. 4.

Figure 8:
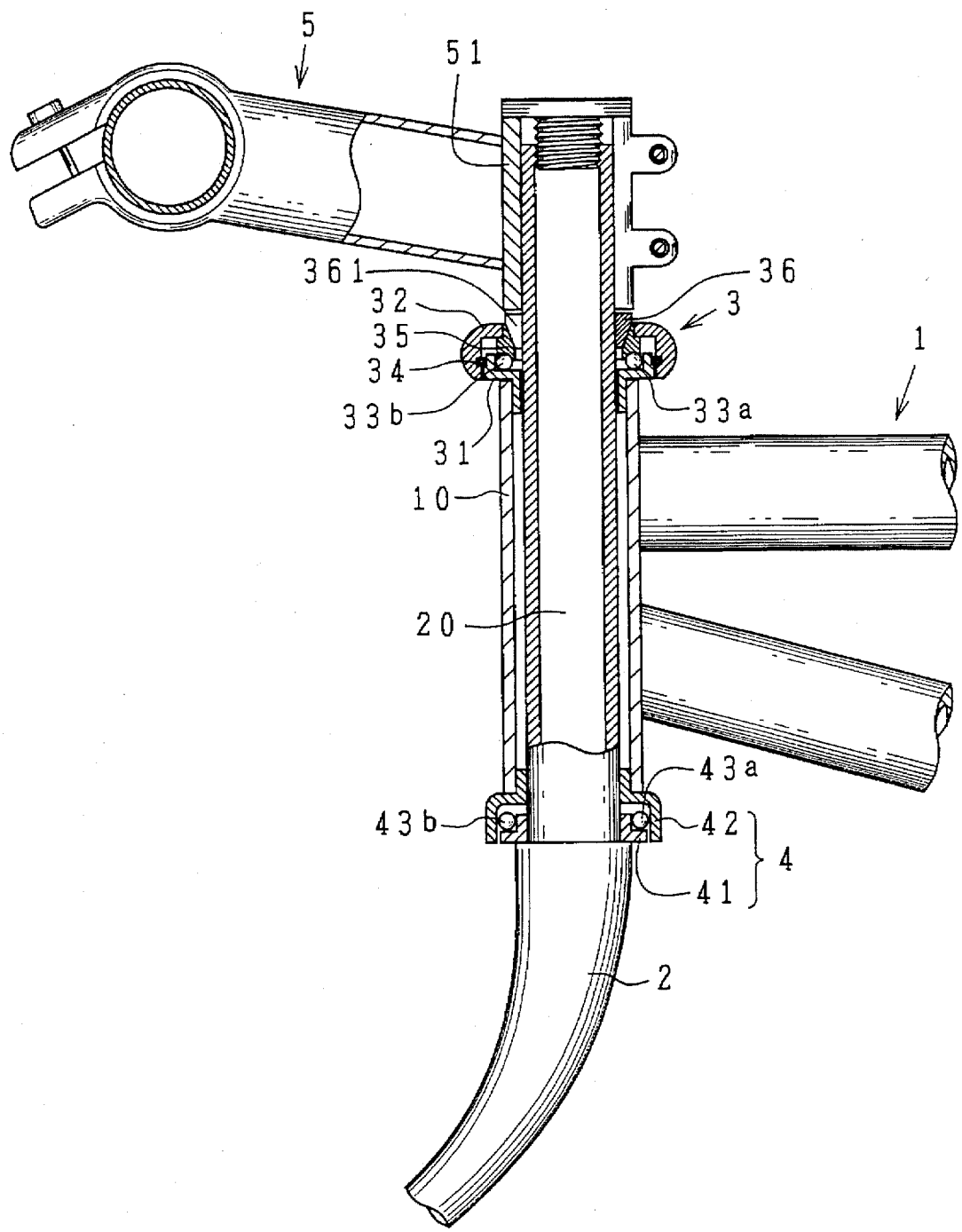
FIG. 8 is a partial sectional view of a conventional bicycle head component.
Figure 9:
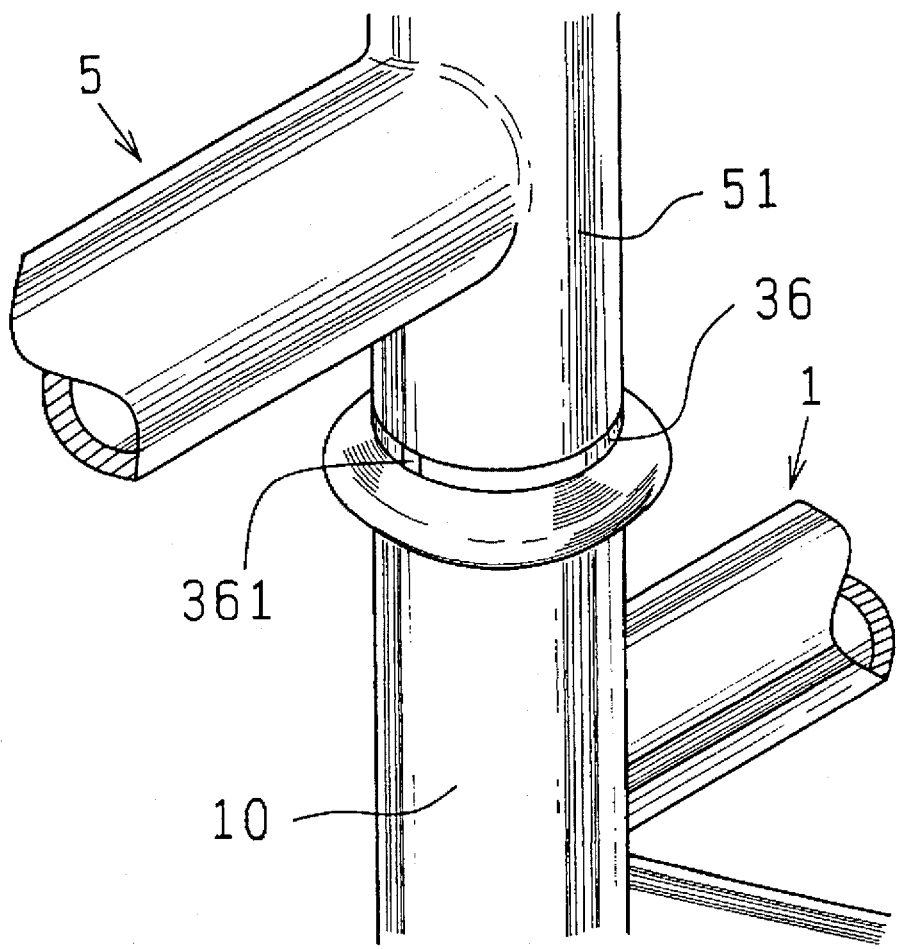
FIG. 9 is an external perspective view of the head component of FIG. 8.

In this embodiment, an independently formed surrounding member 38 made of synthetic resin is added to the upper ball bearing 3, having the same structure as that of the conventional head component shown in FIG. 8.

The surrounding member 38 includes a disk portion 382 having a center hole 381 with a diameter almost equal to the outer diameter of the fork stem 20 and a skirt portion 383 extending outwardly in the downward direction from its outer periphery, as shown in FIG. 5.

In this embodiment, after the top cone 35 and the cone ring 36 are fitted from the upper end of the fork stem 20, the surrounding member 38 is fitted around the fork stem 20. Subsequently, the mounting tube 51 of the handle stem 5 is fitted from the upper end of the fork stem 20. Then, the mounting tube 51 is tightened downward by the cap 6 in the same way as in the first embodiment. Then the top portion of the cone ring 36, or the end portion on the larger diameter side, is surrounded by the surrounding member 38. Then, rainwater and dust from the slit 361 of the cone ring 36 are prevented from invading the portion where the rolling ball groups 33a and 33b are provided.

Figure 6:
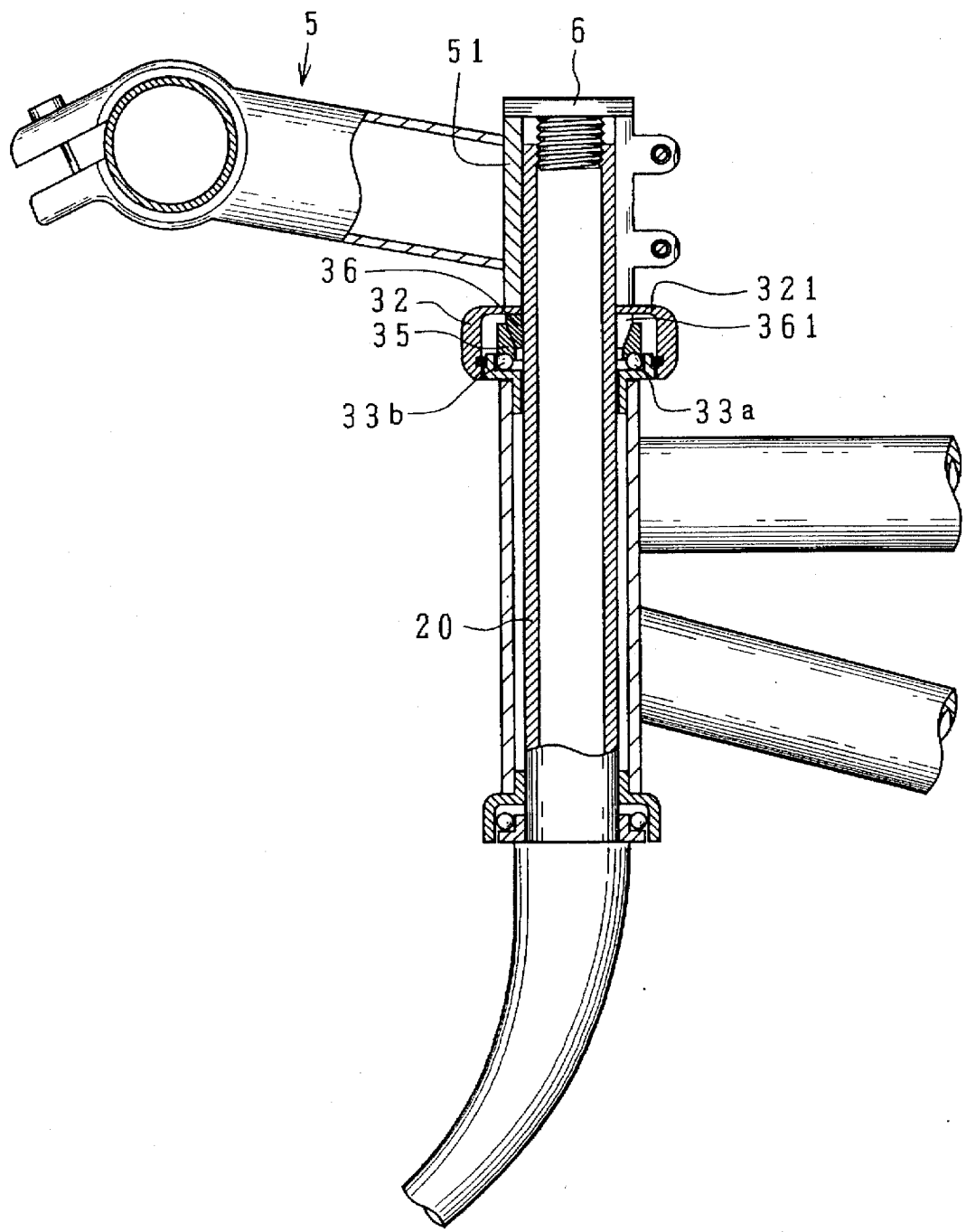
FIG. 6 is a partial sectional view of a bicycle head component according to a third embodiment of the present invention.
Figure 7:
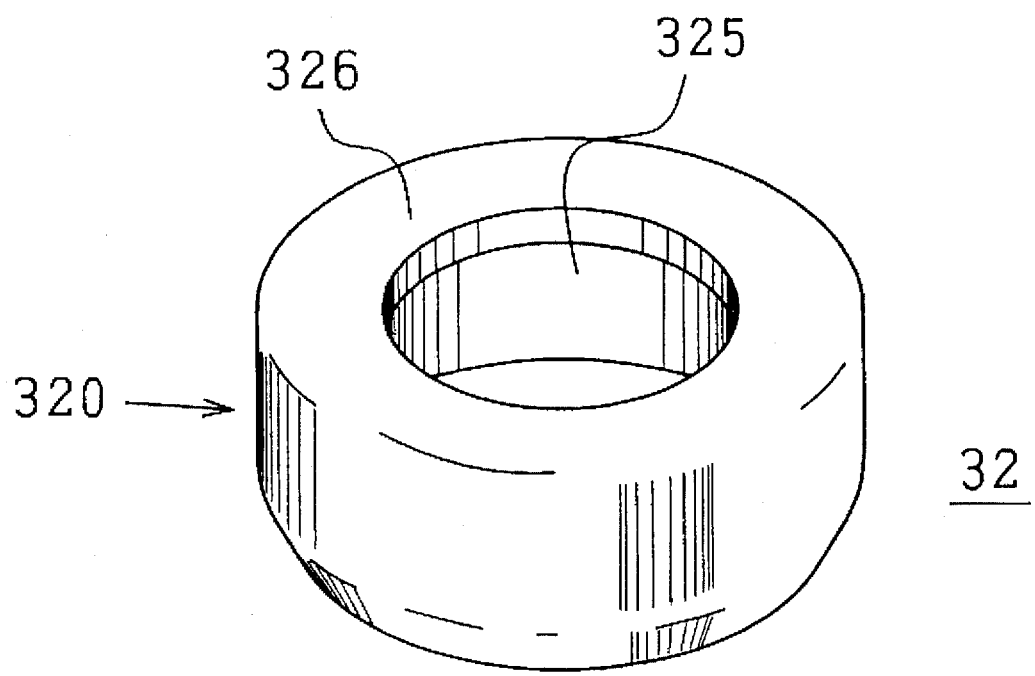
FIG. 7 is a perspective view of the cover shown in FIG. 6.

FIG. 6 is a partial sectional view of a bicycle head component according to a third embodiment of the present invention. FIG. 7 is an external perspective view of the cover 32 of FIG. 6.

The head component according to this embodiment has a structure in which the cone ring 36 is accommodated in the cover 32 made of aluminum. The structure other than the cover 32 is the same as the structure of the head component according to the two above-described embodiments. As shown in FIG. 7, in the cover 32, a center hole 325 having a diameter almost equal to the outer diameter of the fork stem 20 is provided in the center of the upper end wall 326 of the cylindrical cover body 320. When mounted, the cone ring 36 is fitted from the upper end of the fork stem 20. Then, the cover 32 is fitted on the fork stem 20. Furthermore, the mounting tube 51 of the handle stem 5 is tightened downward by the cap 6. Then, the cone ring 36 is accommodated in the cover 32. Thus, the slit 361 of the cone ring 36 is not exposed, and invasion of rainwater etc. through the slit 361 is prevented. Accordingly, the cover 32 functions as a surrounding member in this embodiment.

While the invention has been described in detail, the foregoing description is in all aspects illustrative and not restrictive. It is understood that numerous other modifications and variations can be devised without departing from the scope of the invention.

What is claimed is:

1. A ball bearing of a bicycle head component which rotatably couples a head pipe to a fork stem inserted therethrough, comprising:

a ball head cup attached to an end of the head pipe;

a cover attached around an exposed portion of the fork stem, and facing said ball head cup;

a rolling ball group interposed between said ball head cup and said cover; and a top cone which presses said rolling ball group toward said ball head cup;

wherein said cover comprises an elastic body and has an end periphery that slides in contact with an inner periphery of said ball head cup.

2. The ball bearing according to claim 1, wherein said elastic body is comprised of one of rubber and elastic synthetic resin.

3. The ball bearing according to claim 1, further comprising a metallic reinforcing plate buried in said elastic body.

4. The ball bearing according to claim 1, further comprising a metallic reinforcing plate buried in said elastic body.

* * * * *